United States Patent [19]

Tenny et al.

[11] Patent Number: 5,051,893
[45] Date of Patent: Sep. 24, 1991

[54] SYSTEM FOR PROCESSING DATA TO FACILITATE THE CREATION OF EXECUTABLE IMAGES

[75] Inventors: J. David Tenny, Harvard; Jeff Piazza, Waltham; Gary L. Brown, Harvard; Paul C. Anagnostropoulos, Stow; Bruce A. Foster, Groton; Beryl E. Nelson, Acton; Walter van Roggen, Stow, all of Mass.

[73] Assignee: Digital Equipment Corporation, Maynard, Mass.

[21] Appl. No.: 217,322

[22] Filed: Jul. 11, 1988

[51] Int. Cl.[5] ............................................. G06F 15/00
[52] U.S. Cl. .................................................. 364/200
[58] Field of Search ...................... 364/300, 200, 280.4, 364/280.5, 280.7

[56] References Cited

U.S. PATENT DOCUMENTS

| | | | |
|---|---|---|---|
| 4,667,290 | 5/1987 | Goss et al. | 364/300 |
| 4,672,532 | 6/1987 | JongeVos | 364/200 |
| 4,734,854 | 3/1988 | Adshar | 364/200 |
| 4,821,181 | 4/1989 | Iwasawa et al. | 364/200 |

Primary Examiner—Allen R. MacDonald
Attorney, Agent, or Firm—Fish & Richardson

[57] ABSTRACT

A system for processing code contained in one or more selected files, before the code is linked to form an executable image, features means for determining the locations in memory where the code will be stored after it is linked, and means for revising the code to correspond to the determined memory locations. The object code files include code comprising a programming environment, such as LISP, and code input by a user. The user can delete selected portions of the programming environment. Read only, static, and dynamic memory are utilized and each portion of the code input by the user is evaluated to determine which memory is most appropriate.

8 Claims, 2 Drawing Sheets

A OBJECT FILE

B EXECUTABLE FILE

SYSTEM FOR PROCESSING DATA TO FACILITATE THE CREATION OF EXECUTABLE IMAGES

BACKGROUND OF THE INVENTION

This invention relates to the creation of executable images in sophisticated computer languages such as LISP.

Executable images are preferred over suspended, nonexecutable images since properly created executable images are likely to be more robust in the face of operating system upgrades. Suspended image format is likely to break when created under one operating system version and used under another. In a multiple user environment, the read-only and system shareable portions of an executable image are mapped into memory once. Subsequent invocations of the executable image need only map in the static portions of the executable image. The executable image uses the operating system mapping mechanism to read in and make shareable the read-only and system shareable sections. Suspended images start with a very small "kernel" and require all of the data be mapped in by each user. None of the portions of the suspended image can be made shareable among multiple users. Executable images are faster to load and easier to distribute.

Traditional computer languages, such as FORTRAN, usually create single executable images for the reasons described above. The program is created by the user and compiled to create object code. The object code is then linked by a linker to create the final executable image. A suspended image, on the other hand, is essentially a snapshot (dump) of what memory looked like at the time the system was suspended. It comprises code and data in a format not suitable for use by a linker.

Since languages usually support operations, (e.g., trigonometric functions) that are not available on some processors, compiler developers implement "run-time support" functions as part of the compiler implementation project. These functions are normally contained in one or more run-time support libraries (RTL). Therefore, to generate an executable program, the linker must combine code which provides the selected functions from these libraries with the object code to form the executable image. As a result of this and other functions carried out by a linker, the object code will not be organized in memory exactly as it was in the original object file.

This alteration of the memory locations at which the object code is stored can cause problems since most programs contain interdependencies in the code. The unavoidable reorganization of memory that results when object code is linked will affect these interdependencies. For example, one instruction may require transfer of control to another point in the program (e.q., "go to"). FIG. 1A illustrates an object file containing N lines of object code. An interdependency can exist between point A on location 1 and point B on location 3. The exact displacement in memory between these points must be known for the code to execute properly. A special instruction section of the object file describes all of the interdependencies in the file which the linker uses in resolving the above mentioned dependencies.

FIG. 1B illustrates a traditional executable file. The lines of code are now separated due to the inclusion of functions such as the run time functions, shown at 10, and described above. Since points A and B are now a greater distance apart, the code must be revised to incorporate this change as well as other similar changes. These revisions are performed by the linker in accordance with the instructions contained in the instruction section of the object file.

In a language such as LISP, the compiled code is much more complex than object code created by more traditional languages. In a LISP system, compiled code can be freely mixed with interpreted code and data. Unlike a program developed in, e.q., FORTRAN, a LISP program contains such development tools as an interpreter, an editor, debugging tools, a windowing system, etc. As a result, a linker that could properly create an executable LISP image would have to be able to make extremely complex changes to the object code format and special instruction processing in order to ensure that the code would run in executable form. For example, in a program developed in LISP a source (interpreted) and/or a compiled file can redefine a form-/object of an earlier loaded file. In other words when the system processes a file defining some function F and then processes a second file which redefines the function F, this serves to eliminate the old version of F. A linker would have to be able to recognize this fact at link time. Furthermore, in traditional languages, symbols merely represent locations in memory, while in LISP symbols include some functionality which would have to be evaluated by the linker. LISP objects are freely relocatable and the organization of LISP code may be varied when linked. It must all appear sequentially in the executable image just as it appeared in the object files. There are no linkers available that have the level of sophistication necessary to properly handle these and other complex LISP operations.

Therefore, a LISP programming environment is sold as a suspended image containing all of the LISP files (or modules), combined with a small executable "kernel" to provide access to the suspended image. The kernel is written in a low-level language such as Macro or BLISS. When a user wishes to use the LISP system, the small kernel is executed which serves to load all of the LISP environment into memory (i.e., the editor, interpreter etc.) The memory layout of a typical LISP system is shown in FIG. 2 and includes: a linked-transfer vector which is used to access portions of the low-level language environment from LISP and vice versa; the executable kernel described above; the run time library files; read only memory; static memory; two dynamic memory spaces; and a Bibop table. The Bibop table contains information about the type of data stored on each page of memory. Two dynamic memories are used to facilitate "garbage collections" which is the process of writing all valuable data from one memory space to another (e.q., from dynamic 1 to dynamic 0) to thereby eliminate unwanted data.

SUMMARY OF THE INVENTION

The invention generally comprises a system for processing code contained in one or more selected files, before the code is linked to form an executable image, the system comprising: means for determining the memory locations at which a linker will store the code, and means for revising the code in accordance with the determined memory locations.

The invention also generally comprises a system for processing code before the code is linked to form an executable image, the system comprising: means for storing code comprising a programming environment; means for storing code supplied by a user; and means for deleting selected portions of the code comprising the programming environment.

The invention also generally comprises a system for processing code contained in one or more selected files, before the code is linked to form an executable image, the system comprising: at least first and second storage means for storing the code; and means for evaluating the code to determine in which of the storage means each portion of the code should be stored; wherein the code is stored in either the first or the second storage means under the control of the means for evaluating.

In the preferred embodiment the programming environment is LISP and the user selects which portions (if any) of the LISP environment will not be included in the final executable image. This is accomplished by loading all of the code which provides the environment except the selected portions. In order to determine where the code will be stored in memory, it may be necessary to control where a linker will put the code, depending on the linker utilized. The preferred embodiment utilizes read only, static and dynamic memory and each portion of the user code is evaluated as it is loaded to select the appropriate memory.

The invention is a significant improvement over the prior art since executable LISP images may be created using standard linkers. By predicting where the linker will store the code in the executable image and revising the files accordingly before it is linked, a LISP file may be successfully linked to form an executable image. The ability to delete selected portions of the LISP environment code is an advantage since memory is not wasted storing unneeded code. Deleting LISP code may also have advantages regarding the time spent doing "garbage collections", since there will be less data, and will have advantages regarding licensing requirements since the deleted code may be legally protected code and its deletion may allow the final executable image to be freely sold. A further advantage is achieved by evaluating code to assign it to proper types cf memory In prior art systems, all code input by a user was stored in static and dynamic memory space. The present invention will evaluate the user code and store it in read only or static space where possible (depending on the nature of the user code). This is advantageous for many reasons including the ability to share read only space (dynamic and static space are not shareable). dr

DETAILED DESCRIPTION OF THE PREFERRED EMBODIMENT

Drawings

We first briefly describe the drawings.

OPERATION

A user who desires to create an executable LISP image will first write source code he or she wishes to add, if any, to the standard, commercially available package defining the LISP environment. The user can either use the LISP environment to generate his or her code or use some other environment. The user code and data is normally tested, interpreted and compiled before the LISP system is operated.

Figure 4:
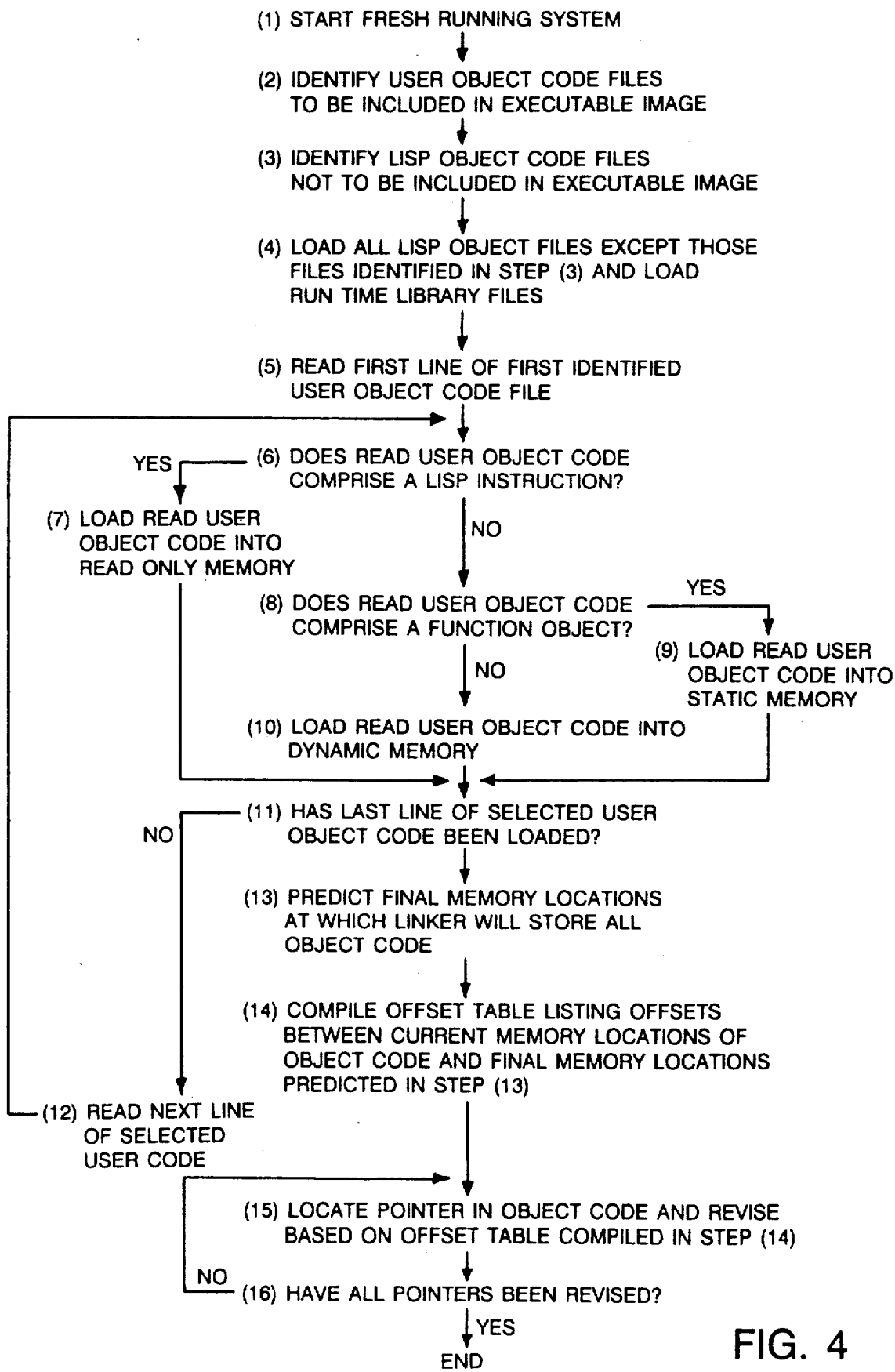
FIG. 4 is a flowchart illustrating the steps performed by the system of the invention.

The system of the invention is then utilized as illustrated in the flowchart of FIG. 4. The user begins with a "fresh running" (i.e., newly started) LISP system (step 1 in FIG. 4). A fresh running system is preferable to minimize the likelihood that files relating to other images will be inadvertently used in the generation of the current image. The user will then define the executable image to be created by identifying the files to be used in the system. These files include the users compiled code ("user code") generated in response to the user s source code (step 2 in FIG. 4), as well as those files relating to the LISP environment ("LISP files") that the user wants to have in the executable image (step 3 in FIG. 4). Unlike most other languages LISP may also include user source code in the final executable image. All LISP files will be included except those specifically excluded by the user. For example, if the image to be created does not need the LISP editor, the user so specifies and the editor will not be included. This elimination of unneeded files has several advantages, as described above.

The system then loads the selected LISP files described above, and the necessary run time library files (step 4 in FIG. 4). The LISP files that the user indicated were to be excluded from the final image in step 3 are not loaded during the load step and thus the functions provided by these files are not included in the executable image created. The selection of which sections of the LISP environment to delete will depend upon the intended use of the final executable image. For example, if the final image will be used by someone who may need to add, modify or delete code or data, then more of the LISP environment, such as the editor or debugger, may be included. On the other hand, if the user of the final image will merely be inputting data and obtaining results, then LISP environment such as the editor and debugger are unnecessary and can be eliminated.

Figure 1A:
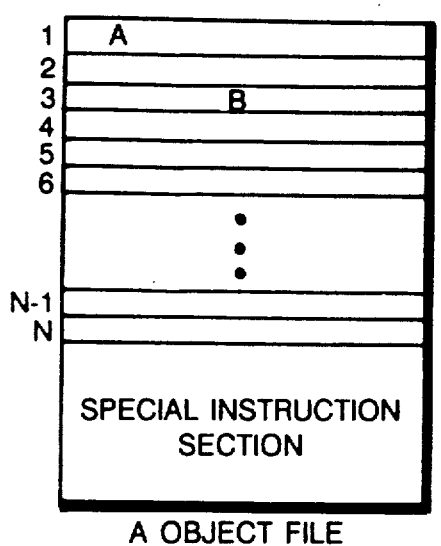
FIGS. 1a and 1b are diagrams illustrating the arrangement of code stored in memory according to traditional languages.
Figure 1B:
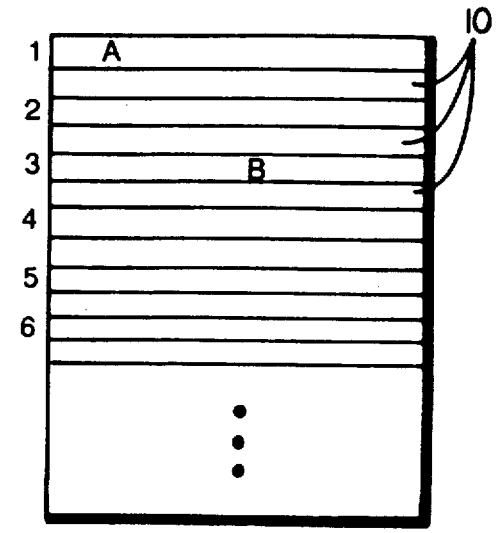
Figure 2:
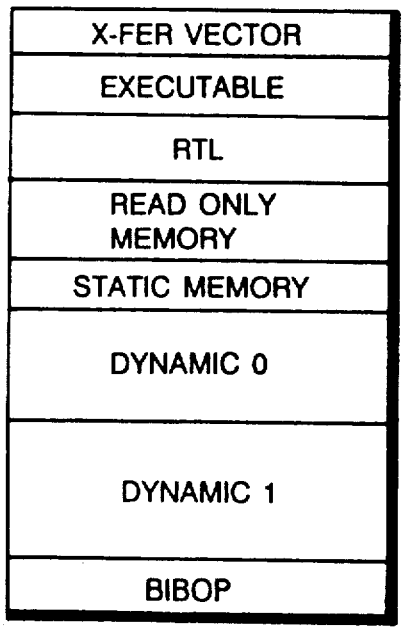
FIG. 2 is a diagram of the memory layout of a LISP programming environment.

The system then loads all the user code into memory (steps 5-12 in FIG. 4). The system evaluates the user code to determine where in memory it should be stored in the memory arrangement shown in FIG. 2. All user code that comprises an instruction (i.e., a LISP instruction in the preferred embodiment) is loaded into read only memory (step 7). This is allowed since instructions cannot (or should not) be changed. Function objects are loaded into static memory (step 9), which is not shareable. Static memory is used here since different users of the final image may have different function objects so this data should not be shareable. Finally, all other user code is stored in dynamic memory (step 10). It is possible to change these rules depending on the application. For example, it is possible to store all constants in read only memory, since constants should not change and should be the same for everyone.

As explained above, the loaded files cannot be linked at this point due to the complex nature of LISP. Therefore, the next step comprises transforming the object (and possibly source) files into files that aa linker can properly link.

The system revises the files in accordance with the locations in memory that the code will be stored after linking (steps 13-16 in FIG. 5). When revising the files the system predicts exactly where the linker will store each line of code in the final executable image (step 13), since any interdependencies must be revised to correspond to the new memory locations. The system then constructs a table comprising the offsets between the current memory location of each object and its future location (step 14). All pointers are then updated using the table (steps 15-16).

The difficulty in making the prediction of step 13 will depend upon the linker which will subsequently be used since some linkers arrange memory in a predictable manner while others will assign memory more randomly. If the linker does not store the data and code in a predictable manner, it will be necessary to "force" the linker to put the final image into memory in a predicatable way when the processed file is linked. The unpredictability of the locations of the code and data usually arises from the linker storing the code and data after something else in memory whose size is not predictable. Since the size of the "something else" is not predictable, you cannot predict where it will end in memory, and therefore you cannot predict where the code and data files will begin. This can be solved by making the linker store the files higher in memory (i.e., before the unpredictable data). The exact locations are then determinable.

Figure 3:
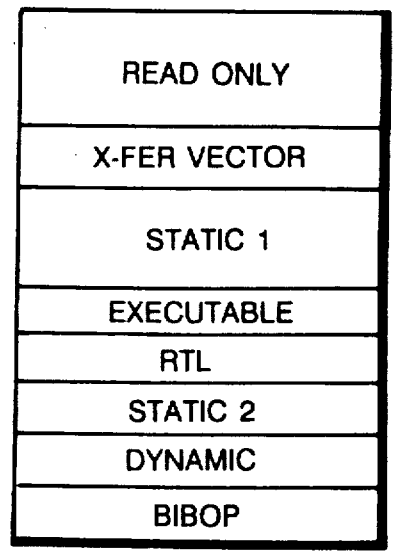
FIG. 3 is a diagram of the memory layout of an executable LISP image.

The files are now ready to be linked by a standard linker creating a final executable image, an example of which is shown in FIG 3. Note that this image includes only a small dynamic memory space, since additional dynamic space can be allocated as needed by a user of the image.

Other embodiments of the invention are within the scope of the appended claims.

We claim:

1. A system for processing code contained in one or more selected files, before said code is linked to form an executable image, said system comprising:
    means for determining the memory locations in memory where said code will be stored in memory after said code is linked; and
    means for revising said code in accordance with said memory locations determined by said means for determining.

2. The apparatus of claim 1 wherein said files include code input by a user.

3. The apparatus of claim 1 wherein said files include code comprising a programming environment.

4. The apparatus of claim 3 wherein said programming environment is LISP.

5. The apparatus of claim 3 further comprising means for deleting selected portions of said code comprising said programming environment.

6. The apparatus of claim 1 further comprising means for controlling where a linker will store said code.

7. The apparatus of claim 1 further comprising first and second storage means for storing said code.

8. The apparatus of claim 7 further comprising means for evaluating said code to determine in which of said storage means each portion of said code should be stored, said code being stored under the control of said means for evaluating.

* * * * *

UNITED STATES PATENT AND TRADEMARK OFFICE
CERTIFICATE OF CORRECTION

PATENT NO.   : 5,051,893

DATED        : September 24, 1991

INVENTOR(S)  : Tenny et al.

It is certified that error appears in the above-identified patent and that said Letters Patent is hereby corrected as shown below:

Col. 3, line 41, after "memory" insert a period;

Col. 3, line 48, delete "dr";

Signed and Sealed this

First Day of June, 1993

Attest:

MICHAEL K. KIRK

*Attesting Officer*     *Acting Commissioner of Patents and Trademarks*